US010304635B2

(12) United States Patent
Suzuki

(10) Patent No.: US 10,304,635 B2
(45) Date of Patent: May 28, 2019

(54) SOLID ELECTROLYTIC CAPACITOR HAVING A DIRECTLY BONDED CATHODE LAYER

(71) Applicant: Murata Manufacturing Co., Ltd., Nagaokakyo-shi, Kyoto-fu (JP)

(72) Inventor: Tomohiro Suzuki, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/686,627

(22) Filed: Aug. 25, 2017

(65) Prior Publication Data

US 2018/0061583 A1 Mar. 1, 2018

(30) Foreign Application Priority Data

Aug. 29, 2016 (JP) ................................ 2016-167177

(51) Int. Cl.

*H01G 9/048* (2006.01)
*H01G 9/15* (2006.01)
*H01G 9/012* (2006.01)
*H01G 9/042* (2006.01)
*H01G 9/26* (2006.01)
*H01G 9/14* (2006.01)

(52) U.S. Cl.

CPC ............. *H01G 9/048* (2013.01); *H01G 9/012* (2013.01); *H01G 9/0425* (2013.01); *H01G 9/15* (2013.01); *H01G 9/26* (2013.01); *H01G 9/14* (2013.01)

(58) Field of Classification Search

CPC ......... H01G 9/048; H01G 9/15; H01G 9/0425
See application file for complete search history.

(56) References Cited

U.S. PATENT DOCUMENTS

| | | | | |
|---|---|---|---|---|
| 4,009,424 | A * | 2/1977 | Itoh | H01G 9/02 29/25.03 |
| 4,483,062 | A * | 11/1984 | Irikura | H01G 9/012 29/25.03 |
| 5,968,209 | A * | 10/1999 | Kono | H01G 9/04 216/6 |
| 7,355,835 | B2 | 4/2008 | Saitou et al. | |
| 8,873,221 | B2 | 10/2014 | Ito et al. | |
| 8,896,984 | B2 | 11/2014 | Kawahito et al. | |
| 9,007,743 | B2 | 4/2015 | Kawai et al. | |
| 2002/0001169 | A1 * | 1/2002 | Shiraishi | H01G 9/012 361/523 |
| 2006/0018084 | A1 * | 1/2006 | Saito | H01G 9/012 361/523 |

(Continued)

FOREIGN PATENT DOCUMENTS

| | | | |
|---|---|---|---|
| CN | 1866428 | A | 11/2006 |
| CN | 102881456 | A | 1/2013 |

(Continued)

*Primary Examiner* — David M Sinclair
(74) *Attorney, Agent, or Firm* — Arent Fox LLP

(57) ABSTRACT

A solid electrolytic capacitor that includes a structure including laminated capacitor elements, each of the capacitor elements including a valve metal base having a porous layer on a surface thereof, a dielectric layer on the porous layer, a solid electrolyte layer on the dielectric layer, and a cathode layer on the solid electrolyte layer. The cathode layers are directly bonded together on at least a portion of a surface of each of the cathode layers between the laminated capacitor elements.

17 Claims, 5 Drawing Sheets

(56) References Cited

U.S. PATENT DOCUMENTS

| | | | | |
|---|---|---|---|---|
| 2006/0262486 | A1* | 11/2006 | Tadanobu | H01G 9/012 361/523 |
| 2006/0262488 | A1* | 11/2006 | Naito | H01G 9/012 361/540 |
| 2006/0262490 | A1 | 11/2006 | Saitou | |
| 2008/0232039 | A1* | 9/2008 | Saito | H01G 9/012 361/534 |
| 2009/0168304 | A1* | 7/2009 | Saito | H01G 9/15 361/524 |
| 2012/0262847 | A1 | 10/2012 | Kawai et al. | |
| 2012/0281338 | A1* | 11/2012 | Lee | H01G 9/15 361/524 |
| 2013/0016453 | A1 | 1/2013 | Ito et al. | |
| 2013/0222977 | A1 | 8/2013 | Kawahito et al. | |
| 2014/0036417 | A1* | 2/2014 | Fujimoto | H01G 9/0425 361/532 |
| 2015/0262759 | A1* | 9/2015 | Ishizaki | H01G 9/012 361/528 |

FOREIGN PATENT DOCUMENTS

| | | | | |
|---|---|---|---|---|
| CN | 103295786 | A | | 9/2013 |
| JP | 03179716 | A | * | 8/1991 |
| JP | 04177817 | A | * | 6/1992 |
| JP | 06204096 | A | * | 7/1994 |
| JP | 06204097 | A | * | 7/1994 |
| JP | H11-288846 | A | | 10/1999 |
| JP | 2003-86465 | A | | 3/2003 |
| JP | 2004158580 | A | * | 6/2004 |
| JP | 2004-188884 | A | | 7/2004 |
| JP | 2007142160 | A | * | 6/2007 |
| JP | 2012-231120 | A | | 11/2012 |

* cited by examiner

SOLID ELECTROLYTIC CAPACITOR HAVING A DIRECTLY BONDED CATHODE LAYER

CROSS REFERENCE TO RELATED APPLICATIONS

The present application claims priority to Japanese Patent Application No. 2016-167177, filed Aug. 29, 2016, the entire contents of which are incorporated herein by reference.

BACKGROUND OF THE INVENTION

Field of the Invention

The present invention relates to a solid electrolytic capacitor.

Description of the Related Art

Multilayer solid electrolytic capacitors having a structure as described in Japanese Unexamined Patent Application Publication No. 2012-231120 are known. Specifically, a multilayer solid electrolytic capacitor having a structure in which capacitor elements are laminated are known, each of the capacitor elements including one capacitor element anode portion of an anode body containing a valve metal, and a capacitor element cathode portion including a dielectric layer, a solid electrolyte layer, a graphite layer, and a silver paste layer arranged, in this order, on the other surface of the anode body. In this structure, the capacitor element cathode portion is laminated by bonding with a conductive adhesive. The capacitor element cathode portion of the capacitor element located at the lower end of the laminated capacitor elements is electrically connected to a cathode terminal with the conductive adhesive.

SUMMARY OF THE INVENTION

The conductive adhesive used to bond the capacitor element cathode portion to another capacitor element cathode portion or the cathode terminal is partially applied to the capacitor element cathode portion. Thus, the capacitor elements are tilted at the time of lamination to fail to laminate the capacitor elements in parallel, in some cases. Furthermore, when a thermal or physical force is applied to the capacitor elements, stress concentration occurs to degrade the electrical characteristics.

The present invention has been made to solve the foregoing problems. It is an object of the present invention to provide a solid electrolytic capacitor in which the degradation of electrical characteristics due to the application of a thermal or physical force to a capacitor element is inhibited.

According to preferred embodiments of the present invention, a solid electrolytic capacitor has a structure including laminated capacitor elements, each of the capacitor elements including a valve metal base having a porous layer on a surface of the valve metal base, a dielectric layer on the porous layer, a solid electrolyte layer on the dielectric layer, and a cathode layer on the solid electrolyte layer. The cathode layers are directly bonded together on at least portions of surfaces of the cathode layers between the laminated capacitor elements.

In the solid electrolytic capacitor according to preferred embodiments of the present invention, the cathode layers are directly bonded together without a conductive adhesive.

The bonding of the capacitor elements without a conductive adhesive inhibits a phenomenon in which the capacitor elements are tilted during lamination because of variations in the thickness of a conductive adhesive, thus laminating the capacitor elements in parallel.

Because the capacitor elements are not tilted during lamination, when a thermal or physical force is applied to a multilayer body including the capacitor elements, the occurrence of stress concentration is also prevented, thereby resulting in a low rate of increase in leakage current particularly after reflow.

In the solid electrolytic capacitor according to preferred embodiments of the present invention, with regard to the surface of each of the cathode layers directly bonded together, preferably, the cathode layers are directly bonded together at a central portion of the surface of each of the cathode layers.

The direct bonding of the cathode layers together at the central portion of the surface of each of the cathode layers reduces the possibility that the capacitor elements are tilted, compared with the case of direct bonding at an end portion of the surface of each of the cathode layers. Thus, the occurrence of stress concentration is more effectively inhibited when a thermal or physical force is applied to the multilayer body including the capacitor elements.

In the solid electrolytic capacitor according to preferred embodiments of the present invention, with regard to the surface of each of the cathode layers directly bonded together, preferably, the cathode layers are directly bonded together in about 30% or more of the area of the surface of each of the cathode layers.

The appropriately large area of the surface of each of the directly bonded cathode layers more effectively inhibits the occurrence of stress concentration when a thermal or physical force is applied to the multilayer body of the capacitor elements. In particular, a low rate of increase in equivalent series resistance (ESR) after reflow is obtained.

In the solid electrolytic capacitor according to preferred embodiments of the present invention, with regard to the entire surface of each of the cathode layers directly bonded together, preferably, no conductive adhesive is present between the cathode layers.

That is, in the solid electrolytic capacitor according to preferred embodiments of the present invention, preferably, the cathode layers are bonded together only by direct bonding, and there is no portion where bonding is established with a conductive adhesive in the cathode layer and the cathode extended electrode. In other words, with regard to a portion of each of the cathode layers where the cathode layers are not directly bonded together between the capacitor elements, the fact that bonding itself is not established is more preferred than bonding with the conductive adhesive.

According to preferred embodiments of the present invention, a solid electrolytic capacitor includes a capacitor element and a cathode extended electrode in contact with the capacitor element, the capacitor element including a valve metal base having a porous layer on a surface thereof, a dielectric layer on the porous layer, a solid electrolyte layer on the dielectric layer, and a cathode layer on the solid electrolyte layer. At least a portion of a surface of the cathode layer of the capacitor element in contact with the cathode extended electrode is directly bonded to the cathode extended electrode.

In the solid electrolytic capacitor according to preferred embodiments of the present invention, the cathode layer of the capacitor element is in direct contact with the cathode extended electrode and bonded together without a conductive adhesive.

The bonding of this portion without a conductive adhesive inhibits a phenomenon in which the capacitor element is tilted because of variations in the thickness of a conductive adhesive when the capacitor element is arranged so as to be in contact with the cathode extended electrode, thus arranging the capacitor element parallel to the cathode extended electrode.

Because the capacitor element is not tilted, when a thermal or physical force is applied to the capacitor element, the occurrence of stress concentration is also prevented, thereby resulting in a low rate of increase in leakage current particularly after reflow.

In the solid electrolytic capacitor according to preferred embodiments of the present invention, with regard to a surface of each of the cathode layer and the cathode extended electrode directly bonded together, preferably, the cathode layer and the cathode extended electrode are directly bonded together at a central portion of the surface of the cathode layer.

The direct bonding of the cathode layer and the cathode extended electrode together at the central portion of the surface of the cathode layer reduces the possibility that the capacitor element is tilted, compared with the case of direct bonding at an end portion of the surface of the cathode layer. Thus, the occurrence of stress concentration is more effectively inhibited when a thermal or physical force is applied to the capacitor element.

In the solid electrolytic capacitor according to preferred embodiments of the present invention, with regard to the surface of each of the cathode layer and the cathode extended electrode directly bonded together, preferably, the cathode layer and the cathode extended electrode are directly bonded together in about 30% or more of the area of the surface of the cathode layer.

The appropriately large area of the surface of the cathode layer and the cathode extended electrode directly bonded together more effectively inhibits the occurrence of stress concentration when a thermal or physical force is applied to the capacitor element. In particular, a low rate of increase in ESR after reflow is obtained.

In the solid electrolytic capacitor according to preferred embodiments of the present invention, with regard to the surface of the cathode layer directly bonded to the cathode extended electrode, preferably, no conductive adhesive is present between the cathode layer and the cathode extended electrode.

That is, in the solid electrolytic capacitor according to preferred embodiments of the present invention, preferably, the cathode layer is bonded to the cathode extended electrode only by direct bonding, and there is no portion where bonding is established with a conductive adhesive in the cathode layer and the cathode extended electrode. In other words, with regard to a portion of each of the cathode layer and the cathode extended electrode where the cathode layer and the cathode extended electrode are not directly bonded together, the fact that bonding itself is not established is more preferred than bonding with the conductive adhesive.

According to preferred embodiments of the present invention, a solid electrolytic capacitor has a structure including laminated capacitor elements, and a cathode extended electrode, at least one of the capacitor elements being in contact with the cathode extended electrode. Each of the capacitor elements including a valve metal base having a porous layer on a surface of the valve metal base, a dielectric layer on the porous layer, a solid electrolyte layer on the dielectric layer, and a cathode layer on the solid electrolyte layer. The cathode layers between the laminated capacitor elements are directly bonded together on at least a portion of a surface of each of the cathode layers, and at least a portion of a surface of the cathode layer of the capacitor element in contact with the cathode extended electrode is directly bonded to the cathode extended electrode.

In the solid electrolytic capacitor according to preferred embodiments of the present invention, the cathode layers between the laminated capacitor elements are directly bonded together, the cathode layer of the capacitor element and the cathode extended electrode are directly bonded together, each without a conductive adhesive.

The bonding of these portions without a conductive adhesive inhibits the fact that the capacitor elements are tilted because of variations in the thickness of a conductive adhesive when the capacitor elements are laminated and when the capacitor element is arranged so as to be in contact with the cathode extended electrode, thus arranging the capacitor elements parallel to the cathode extended electrode and the other capacitor elements.

Because the capacitor element is not tilted, when a thermal or physical force is applied to the capacitor elements, the occurrence of stress concentration is also prevented, thereby resulting in a low rate of increase in leakage current particularly after reflow.

In the solid electrolytic capacitor according to preferred embodiments of the present invention, with regard to the surface of each of the cathode layers directly bonded together, preferably, the cathode layers are directly bonded together at a central portion of the surface of each of the cathode layers.

With regard to the surface of each of the cathode layers directly bonded together, preferably, the cathode layers are directly bonded together in about 30% or more of the area of the surface of each of the cathode layers.

With regard to the surface of each of the cathode layers directly bonded together, preferably, no conductive adhesive is present between the cathode layers.

In the solid electrolytic capacitor according to preferred embodiments of the present invention, with regard to the surface of each of the cathode layer and the cathode extended electrode directly bonded together, preferably, the cathode layer and the cathode extended electrode are directly bonded together at a central portion of the surface of the cathode layer.

With regard to the surface of the cathode layer and the cathode extended electrode directly bonded together, preferably, the cathode layer and the cathode extended electrode are directly bonded together in about 30% or more of the area of the surface of the cathode layer.

With regard to the surface of each of the cathode layer and the cathode extended electrode directly bonded together, preferably, no conductive adhesive is present between the cathode layer and the cathode extended electrode.

In the solid electrolytic capacitor according to preferred embodiments of the present invention, the cathode layer preferably contains a resin.

When the cathode layer contains a resin, the cathode layer is easily bonded to the cathode layer of another capacitor element or the cathode extended electrode by heating the resin.

The resin is preferably a thermoplastic resin.

When the resin is a thermoplastic resin, the cathode layer is more suited to be directly boded to the cathode layer of another capacitor element or the cathode extended electrode.

In the solid electrolytic capacitor according to preferred embodiments of the present invention, the difference between the maximum thickness portion and the minimum thickness portion of the capacitor element where the cathode layer is formed is preferably within 50 μm per capacitor element, before and after the bonding of the cathode layers together.

The use of the capacitor elements having only small variations in thickness further reduces the possibility that the capacitor elements are tilted when the capacitor elements are laminated. Thus, when a thermal or physical force is applied to a multilayer body including the capacitor elements, the occurrence of stress concentration is further effectively prevented.

According to preferred embodiments of the present invention, it is possible to provide the solid electrolytic capacitor in which the degradation of electrical characteristics due to the application of a thermal or physical force to the capacitor element is inhibited.

Other features, elements, characteristics and advantages of the present invention will become more apparent from the following detailed description of preferred embodiments of the present invention with reference to the attached drawings.

DESCRIPTION OF THE PREFERRED EMBODIMENTS

A solid electrolytic capacitor according to an embodiment of the present invention will be described below.

The present invention is not limited to the following embodiments. Various modifications can be made so long as the subject matter of the invention is not changed. A combination of two or more of individual preferred embodiments of the present invention described below is also included in the present invention.

Capacitor Element

A capacitor element included in a solid electrolytic capacitor according to an embodiment of the present invention will first be described.

Figure 1A:
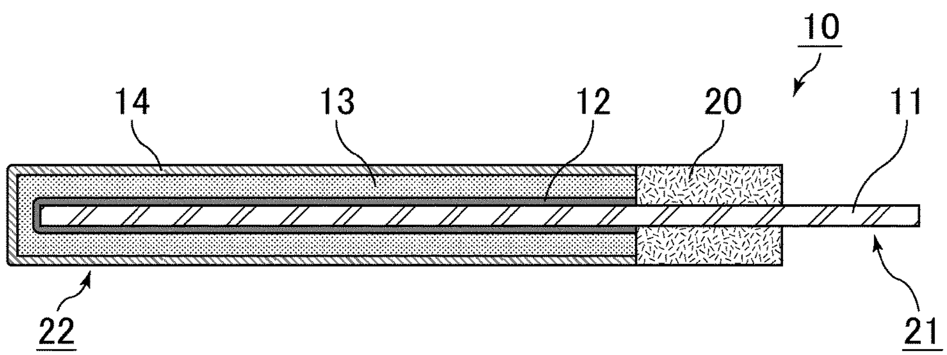
FIGS. 1A and 1B are schematic cross-sectional views of a capacitor element included in a solid electrolytic capacitor, and a surface of the capacitor element according to an embodiment of the present invention.

FIG. 1A is a schematic cross-sectional view of a capacitor element included in the solid electrolytic capacitor according to an embodiment of the present invention.

A capacitor element 10 illustrated in FIG. 1A includes a valve metal base 11 and a dielectric layer 12 on part of a surface of the valve metal base 11. An anode portion 21 is provided on an end portion of the valve metal base 11. An insulating layer 20 serving as an insulating portion having a predetermined width is provided around and on the valve metal base 11 and is in contact with the anode portion 21. In FIG. 1A, the dielectric layer 12 is provided on a portion of the valve metal base 11 excluding the anode portion 21 or the insulating layer 20. A solid electrolyte layer 13 is provided on the dielectric layer 12. A cathode layer 14 is provided on the solid electrolyte layer 13. The solid electrolyte layer 13 is directly bonded to the cathode layer 14. A cathode portion 22 is formed of the cathode layer 14. The dielectric layer 12 may also be provided on a portion of the valve metal base 11 on which the insulating layer 20 is provided and may also be provided on part of the anode portion 21.

In the capacitor element, the valve metal base is composed of a valve metal that exhibits valve action. Examples of the valve metal include elemental metals such as aluminum, tantalum, niobium, titanium, and zirconium, and alloys containing these metals. Of these, aluminum or an aluminum alloy is preferred.

Figure 1B:
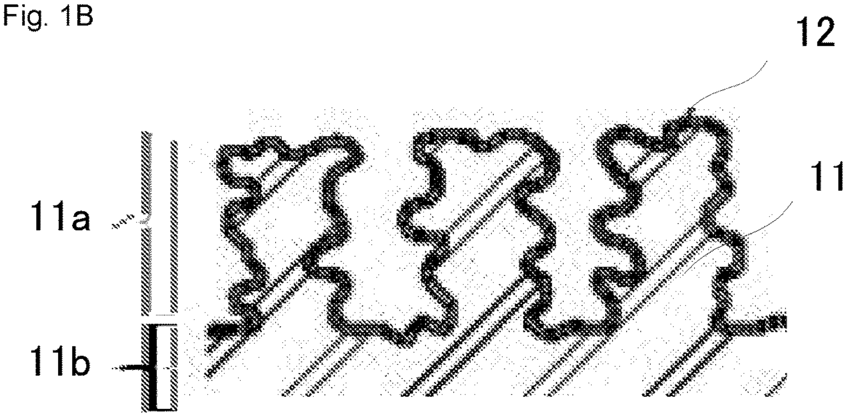

The shape of the valve metal base 11 is preferably a flat plate-like shape, more preferably a foil-like shape. The valve metal base includes a porous layer 11*a* such as an etching layer on a surface thereof. As shown in FIG. 1B, the valve metal base 11 includes the porous layer 11*a* and a core portion 11*b*, and the dielectric layer 12 is provided on the porous layer 11*a*.

The dielectric layer is preferably formed of an oxide film of the valve metal. For example, when aluminum foil is used as the valve metal base, the aluminum foil is subjected to anodic oxidation in an aqueous solution containing, for example, boric acid, phosphoric acid, adipic acid, a sodium salt thereof, or an ammonium salt to form an oxide film.

In the capacitor element, the insulating layer is preferably provided in order to reliably isolate the anode portion and the cathode portion. Examples of a material for the insulating layer include insulating resins such as poly(phenyl sulfone) resins, poly(ether sulfone) resins, cyanate ester resins, fluororesins, for example, tetrafluoroethylene and tetrafluoroethylene-perfluoro(alkyl vinyl ether) copolymers, polyimide resins, polyamide-imide resins, derivatives thereof, and precursors thereof.

Examples of a material for the solid electrolyte layer include conductive polymers having backbones composed of pyrroles, thiophenes, and anilines. An example of conductive polymers having backbones composed of thiophenes is poly(3,4-ethylenedioxythiophene) (PEDOT). The solid electrolyte layer may be composed of PEDOT:PSS, which is PEDOT in combination with poly(styrene sulfonate) (PSS) serving as a dopant.

Although the cathode layer is preferably formed of an underlying carbon layer and a silver layer thereon, the cathode layer may be formed of a carbon layer or silver layer alone. When the cathode layer is formed of the carbon layer and the silver layer, the carbon layer is directly bonded to the silver layer. Each of the carbon layer and the silver layer may be formed of multiple layers and is preferably formed of a single layer.

The cathode layer preferably contains a resin in the outermost surface layer in order to directly bond the cathode layer to a cathode layer of another capacitor element or a cathode extended electrode.

The carbon layer preferably contains conductive carbon and a resin. Examples of the resin that can be used include epoxy resins, polyester resins, and phenolic resins.

The silver layer preferably contains silver and a resin. Examples of the resin that can be used include polyester resins functioning as thermoplastic resins; and epoxy resins, phenolic resins, and polyester resins functioning as thermosetting resins.

The resin in the outermost surface layer of the cathode layer is preferably a thermoplastic resin, particularly preferably a thermoplastic polyester resin. The use of the thermoplastic polyester resin can increase a bonding area on a surface of the cathode layer to reduce ESR and can reduce the rate of increase in ESR due to the application of a thermal or physical force to the multilayer body of capacitor elements.

The capacitor element included in the solid electrolytic capacitor according to an embodiment of the present invention is preferably an element having only small variations in the thickness of a portion of the element including the cathode layer. When the capacitor elements having only small variations in the thickness of the portion of each element including the cathode layer are laminated, the inclination of the resulting laminate is reduced. Specifically, the difference between the maximum thickness and the minimum thickness of a portion of one capacitor element including the cathode layer is preferably within 50 μm before the bonding of the cathode layers together.

Solid Electrolytic Capacitor

A solid electrolytic capacitor including the capacitor element according to embodiments of the present invention will be described below.

In a solid electrolytic capacitor according to a first embodiment of the present invention, cathode layers are directly bonded together between laminated capacitor elements. This embodiment will be described below.

Figure 2A:
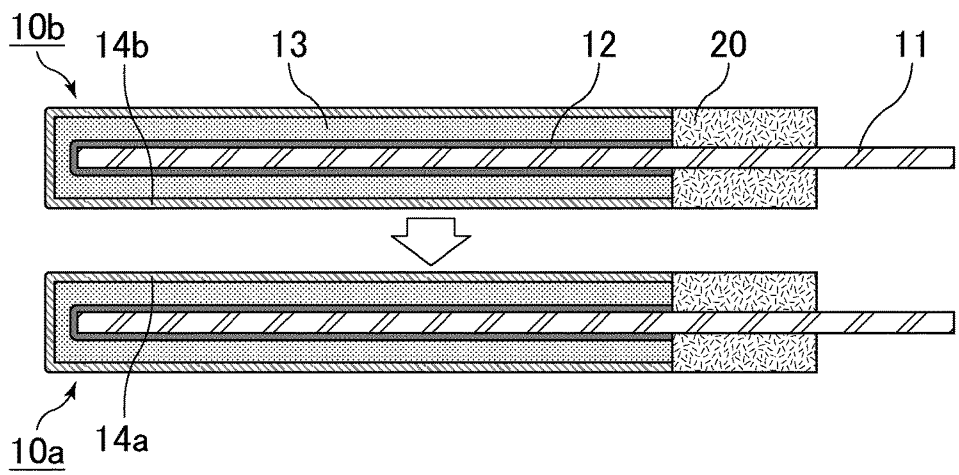
FIGS. 2A and 2B are schematic cross-sectional views of a state in which capacitor elements are laminated to directly bond cathode layers together between the capacitor elements.
Figure 2B:
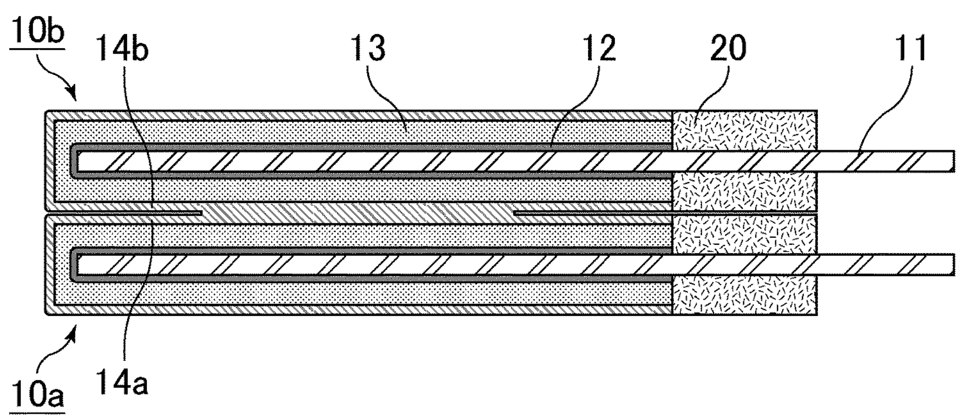

FIGS. 2A and 2B are schematic cross-sectional views of a state in which capacitor elements are laminated to directly bond cathode layers together between the capacitor elements.

FIG. 2A illustrates a state in which a capacitor element 10*a* and a capacitor element 10*b* before bonding are arranged in such a manner that the cathode layers (a cathode layer 14*a* and a cathode layer 14*b*) face each other.

When a surface of the cathode layer 14*a* of the capacitor element 10*a* and a surface of the cathode layer 14*b* of the capacitor element 10*b* face each other and are subjected to heating and pressing (the direction of application of a force is indicated by an arrow in FIG. 2A, and the capacitor element 10*b* illustrated on the upper side of the figure is pressed against the capacitor element 10*a*), the cathode layers (the cathode layer 14*a* and the cathode layer 14*b*) are directly bonded together owing to the action of the resin contained in the cathode layers.

FIG. 2B illustrates a state in which the cathode layers (cathode layers 14*a* and 14*b*) of the capacitor elements 10*a* and the 10*b* are directly bonded together.

In a portion where the cathode layers 14*a* and 14*b* are directly bonded together, the cathode layers are unified. In FIG. 2B, the portion where the cathode layers are unified by the direct bonding is indicated by not drawing a boundary line between the cathode layers 14*a* and 14*b*.

In FIG. 2B, a portion where the cathode layers 14*a* and 14*b* are not bonded together is indicated by leaving the boundary line between the cathode layers 14*a* and 14*b*.

FIG. 2B illustrates a state in which the cathode layers are directly bonded together at a central portion of the surface of each of the cathode layers. The expression "the cathode layers are directly bonded together at a central portion of the surface of each of the cathode layers" indicates that the bonding is established in a region including the center of the surface of each of the cathode layers facing each other. The center of the surface of each of the cathode layers may be defined as a center of gravity of the shape of the surface of each of the cathode layers. The surface of each of the cathode layers often has a substantially rectangular shape. In this case, the center of gravity is located at an intersection point of diagonal lines. Bonded regions of the surfaces of the cathode layers can be determined by separating the bonded capacitor elements from each other at the surfaces of the cathode layers and observing pressure-bonding marks.

Figure 3:
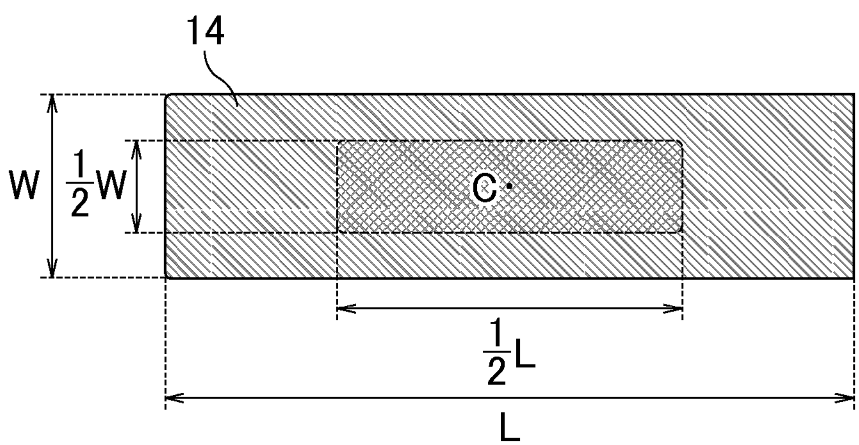
FIG. 3 is a schematic top view of a bonded region of a surface of a cathode layer.

FIG. 3 is a schematic top view of a bonded region of a surface of the cathode layer.

FIG. 3 illustrates the cathode layer 14 having a substantially rectangular shape in plane, a length L indicated by a double-sided arrow, and a width W indicated by a double-sided arrow. As an example of the bonded region, a region that includes the center C of the substantial rectangle (the center of gravity of the substantial rectangle), that has a length of about ½L, and that has a width of about ½W is indicated by the rectangle.

In this case, about 25% (about ½×about ½×100(%)) of the area of the surface of the cathode layer 14 is the region bonded.

The size of the bonded region of the surface of each of the cathode layers can also be measured by separating the bonded capacitor elements from each other at the surfaces of the cathode layers and observing pressure-bonding marks.

With regard to the surface of each of the cathode layers directly bonded together, the cathode layers are directly bonded together in preferably about 30% or more, more preferably about 40% or more, even more preferably about 50% or more. Most preferably, the cathode layers are directly bonded together in the total area (about 100%) of the surface of each of the cathode layers.

With regard to the entire surface of each of the cathode layers directly bonded together, preferably, no conductive adhesive is present between the cathode layers. As illustrated in FIG. 2B, in the case where there is a portion of each of the cathode layers that are not directly bonded together, the fact that bonding itself is not established in the portion is more preferred than bonding with the conductive adhesive.

In the portions where the boundary line between the cathode layer 14*a* and the cathode layer 14*b* is left in FIG. 2B, the cathode layer 14*a* and the cathode layer 14*b* are separated from each other, and there is a gap therebetween.

In a solid electrolytic capacitor according to a second embodiment of the present invention, a cathode layer of the capacitor element and a cathode extended electrode are directly bonded together. This embodiment will be described below.

Figure 4:
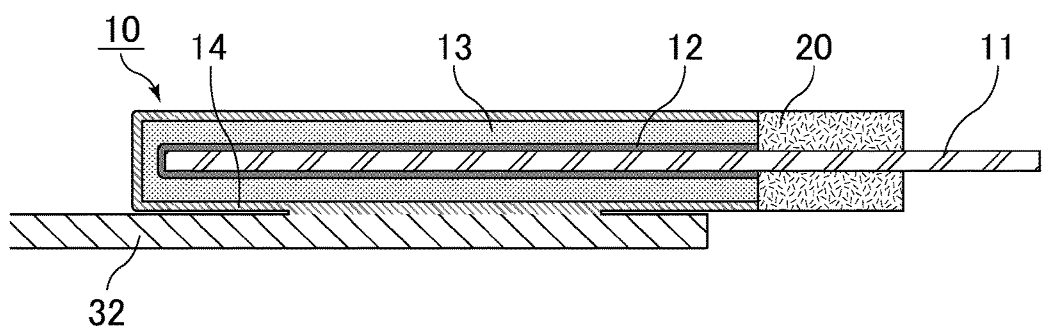
FIG. 4 is a schematic cross-sectional view of a state in which a cathode layer of a capacitor element and a cathode extended electrode are directly bonded together.

FIG. 4 is a schematic cross-sectional view of a state in which a cathode layer of a capacitor element and a cathode extended electrode are directly bonded together.

The cathode extended electrode is an electrode to be electrically connected to the cathode layer of the capacitor element. As the cathode extended electrode, for example, a terminal electrode or a lead, which is part of a wiring pattern provided on a substrate, can be used.

FIG. 4 illustrates a state in which a cathode extended electrode 32 and the cathode layer 14 of the capacitor element 10 are directly bonded together. Because the cathode extended electrode and the cathode layer are usually composed of different materials, when the cathode extended electrode and the cathode layer are directly bonded together, both are not unified. In FIG. 4, however, a portion where the cathode extended electrode and the cathode layer are directly bonded together is indicated by not drawing a boundary line between a hatch pattern indicating the cathode extended electrode 32 and a hatch pattern indicating the cathode layer 14.

A portion where the cathode extended electrode 32 and the cathode layer 14 are not bonded together is indicated by leaving the boundary line between the cathode extended electrode 32 and the cathode layer 14.

FIG. 4 illustrates a state in which the cathode layer and the cathode extended electrode are directly bonded together at a central portion of the surface of the cathode layer. The meaning of the expression "the cathode extended electrode are directly bonded together at a central portion of the surface of the cathode layer" is similar to the meaning described in the case of the expression "the cathode layers of the capacitor elements are directly bonded together at a central portion of the surface of each of the cathode layers".

The size of the bonded region of the surface of the cathode layer is as defined in the description in the case of directly bonding the cathode layers of the capacitor elements together.

A bonded region and the size of the bonded region of the surface of the cathode layer can be determined by separating the cathode layer of the capacitor element from the cathode extended electrode and observing the pressure-bonding marks of the cathode layer.

With regard to the surface of the cathode layer and the cathode extended electrode directly bonded together, the cathode layer and the cathode extended electrode are directly bonded together in preferably about 30% or more, more preferably about 40% or more, even more preferably about 50% or more of the area of the surface of the cathode layer.

Most preferably, the area of the surface of the cathode layer directly bonded to the cathode extended electrode is equal to the total area (about 100%) of the surface of the cathode layer.

With regard to the surface of the cathode layer directly bonded to the cathode extended electrode, no conductive adhesive is present between the cathode layer and the cathode extended electrode. As illustrated in FIG. 4, in the case where there is a portion of the cathode layer that is not directly bonded to the cathode extended electrode, the fact that bonding itself is not established in the portion is more preferred than bonding with the conductive adhesive.

In the solid electrolytic capacitor according to an embodiment of the present invention, the concept of "a capacitor element in contact with a cathode extended electrode" includes the case where the cathode extended electrode is located at a lower portion and where the capacitor element is located at an upper portion as illustrated in FIG. 4; the case where the capacitor element is located at a lower portion and where the cathode extended electrode is located at an upper portion; and the case where the cathode extended electrode is held between two capacitor elements.

The solid electrolytic capacitor may include cathode extended electrodes.

In a solid electrolytic capacitor according to a third embodiment of the present invention, cathode layers are directly bonded together between laminated capacitor elements, and the cathode layer of the capacitor element is directly bonded to a cathode extended electrode. This embodiment will be described below.

Figure 5:
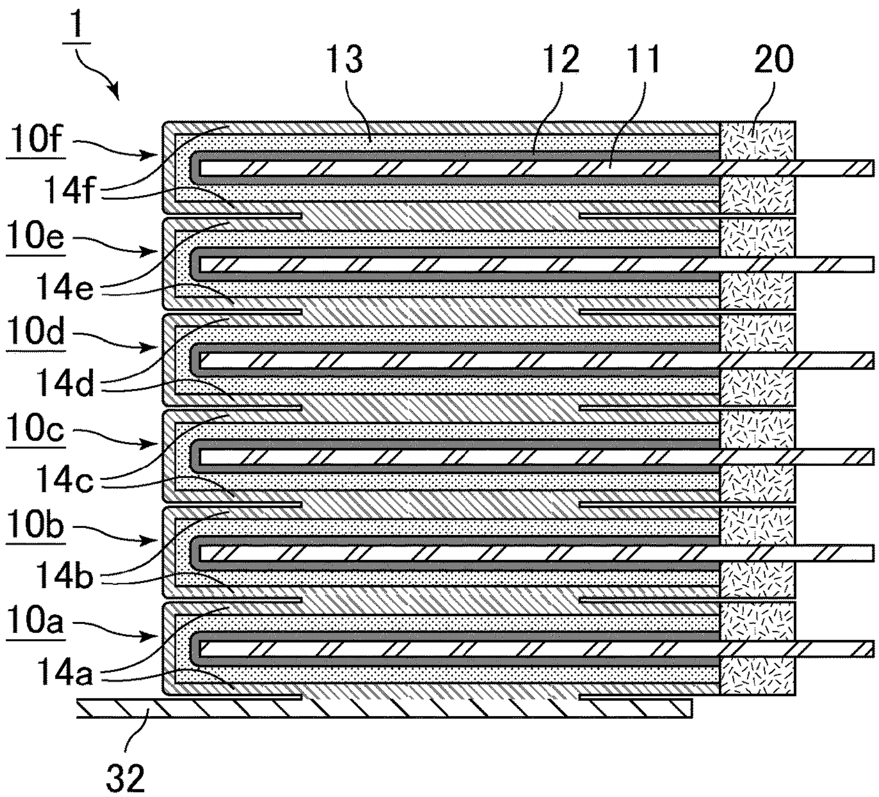
FIG. 5 is a schematic cross-sectional view of an example of a solid electrolytic capacitor according to an embodiment of the present invention.

FIG. 5 is a schematic cross-sectional view of an example of a solid electrolytic capacitor according to an embodiment of the present invention.

A solid electrolytic capacitor 1 has a structure in which the cathode extended electrode 32 is located at the bottom, the capacitor element 10*a* is in contact with the cathode extended electrode 32, and the capacitor element 10*b*, a capacitor element 10*c*, a capacitor element 10*d*, a capacitor element 10*e*, and a capacitor element 10*f* are stacked, in this order, on the capacitor element 10*a*.

The cathode layer 14*a* of the capacitor element 10*a* in contact with the cathode extended electrode 32 is directly bonded to the cathode extended electrode 32. The state of the direct bonding is the same as in the foregoing solid electrolytic capacitor according to the second embodiment of the present invention. Thus, the detailed description is not repeated.

Two adjoining capacitor elements among the capacitor elements 10*a*, 10*b*, 10*c*, 10*d*, 10*e*, and 10*f* (two adjoining cathode layers among the cathode layers 14*a*, 14*b*, 14*c*, 14*d*, 14*e*, and 14*f*) are directly bonded together.

The state of the direct bonding is the same as in the foregoing solid electrolytic capacitor according to the first embodiment of the present invention. Thus, the detailed description is not repeated.

FIG. 5 illustrates only characteristic portions in the structure of the solid electrolytic capacitor, and detailed portions such as the connection between the anode portion and the outside and resin sealing are omitted. Regarding these portions, a structure used for a common solid electrolytic capacitor can be used.

Method for Producing Solid Electrolytic Capacitor

An example of a method for producing a solid electrolytic capacitor according to an embodiment of the present invention will be described below.

A method for producing a solid electrolytic capacitor as illustrated in FIG. 5 is exemplified below.

Capacitor elements are first produced. A known method for producing a capacitor element can be employed. For example, the capacitor elements are produced as described below.

Valve metal bases having a porous layer such as an etching layer on a surface thereof are prepared. The valve metal bases are as described in Section "Capacitor Element". The valve metal bases have an anode extended portion, a cathode layer forming portion, and an insulating layer forming portion that isolate the anode extended portion from the cathode layer forming portion.

A dielectric layer formed of an oxide film is formed on a surface of the cathode layer forming portion of each of the valve metal bases. The oxide film is formed by subjecting the surface of the valve metal base to anodic oxidation treatment (also referred to as "chemical conversion treatment").

An insulating layer is preferably formed on a surface of the insulating layer forming portion of the valve metal base. The materials described in Section "Capacitor Element" can be used for the insulating layer. The insulating layer is formed by applying a material such as an insulating resin to the surface of the insulating layer forming portion and solidifying or curing the material under heating. The formation of the insulating layer may be performed prior to the formation of the dielectric layer.

The valve metal base having the dielectric layer on the surface thereof is covered with a solid electrolyte layer. As the solid electrolyte layer, preferably, an inner layer is formed inside the dielectric layer and the porous layer of the valve metal base, and then an outer layer is formed on the surface of the dielectric layer.

The solid electrolyte layer is formed by, for example, subjecting a dispersion containing a conductive polymer dispersed therein (also referred to as a "conductive polymer dispersion") or a dispersion containing a precursor of a conductive polymer (monomer dispersion) to drying or polymerization.

A cathode layer is formed on the solid electrolyte layer. Although the cathode layer is preferably formed by laminating a carbon layer and a silver layer in this order, the cathode layer may be formed of the carbon layer alone or the silver layer alone. The carbon layer and the silver layer are formed by, for example, applying and drying a carbon paste and then applying and drying a silver paste.

The carbon paste preferably contains a conductive carbon and a resin. Examples of the resin that can be used include epoxy resins, polyester resins, and phenolic resins.

The silver paste preferably contains silver and a resin. Examples of the resin that can be used include polyester resins serving as thermoplastic resins; and epoxy resins, phenolic resins, and polyester resins serving as thermosetting resins.

The resin contained in the carbon paste and/or the silver paste used for the formation of the outermost side portion of the cathode layer is preferably a thermoplastic resin, particularly preferably a thermoplastic polyester resin. The use of the thermoplastic polyester resin can increase the bonding area of a surface of the cathode layer to reduce ESR and can reduce the rate of increase in ESR at the time of the application of a thermal or physical force to the multilayer body of the capacitor elements.

The capacitor elements can be produced through the foregoing steps.

One of the produced capacitor elements is placed on a substrate including a cathode extended electrode in such a manner that the cathode portion of the capacitor element is laid on top of the cathode extended electrode. The capacitor elements are placed on the capacitor element in such a manner that the central portions are laid on top of another, thereby forming a multilayer body.

Subsequently, the resulting multilayer body is subjected to heating and pressing to establish the direct bonding between the cathode extended electrode and the cathode portion of the capacitor element and between the cathode portions of the laminated capacitor elements.

Regarding the heating and pressing conditions of the multilayer body, the heating temperature is preferably about 100° C. or higher and about 250° C. or lower, the pressing force per multilayer body is preferably about 1 N or more and about 10 N or less, and the heating and pressing time is about 10 seconds or more and about 600 seconds or less.

The cathode extended electrode may not be formed on the substrate and may be provided between two capacitor elements. In this case, the following procedure may be performed: Cathode portions of capacitor elements are laid on top of another to form a multilayer body of the capacitor elements. A cathode extended electrode such as a lead is placed on the multilayer body. The cathode portion of another capacitor element is laid on top of the cathode extended electrode. Another multilayer body of capacitor elements is laid on top thereof. Thereby, a multilayer body including the cathode extended electrode provided between the cathode portions is produced. Then the resulting multilayer body is subjected to heating and pressing.

When the multilayer body is produced, preferably, no conductive adhesive is used between the cathode extended electrode and the cathode portion of the capacitor element or between the cathode portions of the capacitor elements.

The solid electrolytic capacitor according to an embodiment of the present invention can be produced through the foregoing steps. Furthermore, the solid electrolytic capacitor is preferably sealed by a method such as transfer molding so as to expose the cathode extended electrode and the anode portions.

EXAMPLE

Examples that specifically disclose a solid electrolytic capacitor according to an embodiment of the present invention will be described below. The present invention is not limited to these examples.

Example 1

Chemically converted aluminum foil including an etching layer on a surface thereof was prepared as a valve metal base. A dielectric layer formed of an oxide film was formed so as to cover aluminum foil. The resulting chemically converted aluminum foil was used as an anode component. The oxide film was formed by immersing surfaces of the aluminum foil in an aqueous ammonium adipate solution and applying a voltage thereto.

To prevent a short circuit between an anode and a cathode, a belt-like insulating layer was formed at a position a predetermined distance from an end of the chemically converted aluminum foil in the long axis direction so as to surround the chemically converted aluminum foil.

A larger-area portion (etching layer) of the chemically converted aluminum foil segmented by the insulating layer was impregnated with a conductive polymer dispersion to form an inner layer of a solid electrolyte layer. As the conductive polymer dispersion for the inner layer, commercially available PEDOT:PSS (Orgacon HIL-1005, from Sigma-Aldrich) was used.

Subsequently, the entire valve metal base including the dielectric layer was immersed in a conductive polymer-containing dispersion to form an outer layer of the solid electrolyte layer, thereby coating the valve metal base with the solid electrolyte layer. As the conductive polymer-containing dispersion for the outer layer, a dispersion containing commercially available PEDOT:PSS (Orgacon HIL-1005, from Sigma-Aldrich) was used. The conductive polymer-containing dispersion contained water serving as a dispersion medium and dimethyl sulfoxide (DMSO) serving as a high-boiling-point solvent.

A surface of the solid electrolyte layer was immersed in a carbon paste and then dried to from a carbon layer. As a resin in the carbon paste, a phenolic resin was used.

A surface of the resulting carbon layer was immersed in a silver paste and then dried to form a silver layer. As a resin in the silver paste, a thermoplastic polyester resin was used.

In this way, a cathode layer formed of the carbon layer and the silver layer was formed to produce a capacitor element.

The cathode layer of the resulting capacitor element was laid on top of a copper electrode on a glass-epoxy substrate including the copper electrode serving as a cathode extended electrode. Another capacitor element was laid on top of the cathode layer of the capacitor element. This operation was repeated to form a six-layer multilayer body.

This multilayer body was subjected to thermocompression bonding at a pressing temperature of about 200° C., a pressing force of about 3 N, and a pressing time of about 30 seconds. The phrase "a pressing force of about 3 N" indicates a pressing force of about 3 N per multilayer body.

The thermocompression bonding resulted in the direct bonding of the surface of the cathode layer of the capacitor element and the cathode extended electrode and resulted in the direct bonding of the cathode layers between the laminated capacitor elements.

The resulting multilayer body was sealed with a silica powder-containing epoxy resin by transfer molding in such a manner that the cathode extended electrode and the anode portions were exposed.

A conductive resin paste was applied to a surface of the sealing resin in such a manner that the exposed anode portions were electrically connected together. The conductive resin paste was also applied to an exposed surface of the cathode extended electrode. Then Ni plating and Sn plating were performed to form an outer anode electrode and an outer cathode electrode.

Thereby, a solid electrolytic capacitor was produced through the foregoing steps.

Examples 2 to 4

Solid electrolytic capacitors were produced as in Example 1, except that the pressing conditions of the multilayer bodies were changed as listed in Table.

Example 5

A solid electrolytic capacitor was produced as in Example 1, except that a thermosetting epoxy resin was used as the resin in the silver paste in place of the thermoplastic polyester resin and the pressing conditions of the multilayer body were changed as listed in Table.

Comparative Example 1

First, about 0.20 mg of a silver-containing conductive adhesive was applied between a copper electrode of a glass-epoxy substrate and a cathode layer of a capacitor element and between cathode layers of capacitor elements, thereby forming a multilayer body. The pressing conditions of the multilayer body were changed as listed in Table.

The other conditions were the same as in Example 1. Under these conditions, a solid electrolytic capacitor was produced.

Comparative Example 2

A multilayer body was formed as in Comparative example 1, except that the amount of the silver-containing conductive adhesive applied between a copper electrode of a glass-epoxy substrate and a cathode layer of a capacitor element and between cathode layers of capacitor elements was changed to about 0.05 mg and that the pressing conditions of the multilayer body were changed as listed in Table.

The other conditions were the same as in Comparative example 1. Under these conditions, a solid electrolytic capacitor was produced.

Initial Characteristics

The solid electrolytic capacitors produced in the examples and the comparative examples were subjected to tests described below.

Determination of Bonding Area and Bonding Position

About 10 solid electrolytic capacitors were produced for each of the examples and the comparative examples. Each of the capacitor elements were separated from the solid electrolytic capacitors. The bonding areas were determined from pressure-bonding marks. Each of the bonding areas was divided by the area of the cathode layer to calculate the percentage of the bonding area with respect to the area of the surface of the cathode layer.

The percentages of the bonding areas of the cathode layers of the laminated capacitor elements were calculated, and the average bonding areas were listed in Table.

The bonding positions were determined from the pressure-bonding marks. In any of Examples 1 to 5 and Comparative examples 1 and 2, it was found that the bonding was established in the central portion of the surface of each of the cathode layers.

Measurement of ESR

The equivalent series resistance (ESR) was measured with an LCR meter at about 100 kHz. The resulting value was defined as the initial ESR.

Measurement of Leakage Current (LC)

Probes were attached to the anode side and the cathode side of each of the solid electrolytic capacitors to connect an ammeter. A voltage of about 16 V was applied, and a current value after about 2 minutes was measured as leakage current (LC at 2 min).

Characteristics after Reflow

Each of the solid electrolytic capacitors was subjected to high-temperature treatment under reflow conditions (maximum temperature: about 260° C., about 255° C. or higher for 30 seconds) in conformity with J-STD-020D (JEDEC). Then ESR and LC were measured as in Section "Measurement of ESR" and "Measurement of Leakage Current (LC).

TABLE

| | | | Pressing conditions | | | Characteristic value | | | | |
|---|---|---|---|---|---|---|---|---|---|---|
| | | | | | | | Initial characteristics | | Characteristics after reflow(*) | |
| | | | | Pressure | | | | | | |
| | Resin in silver paste | Conductive adhesive | Temperature (° C.) | (N/multilayer body) | Time (s) | Bonded area (%) | ESR (mΩ) | LC at 2 min (μA) | ESR (%) | LC at 2 min (%) |
| Example 1 | Thermoplastic polyester | no | 200 | 3 | 30 | 50 | 26 | 0.2 | 100 | 150 |
| Example 2 | Thermoplastic polyester | no | 200 | 0.6 | 30 | 30 | 40 | 1.4 | 130 | 250 |
| Example 3 | Thermoplastic polyester | no | 150 | 0.6 | 30 | 30 | 50 | 0.9 | 150 | 250 |
| Example 4 | Thermoplastic polyester | no | 200 | 0.15 | 30 | 10 | 100 | 2.0 | 300 | 200 |
| Example 5 | Thermosetting epoxy | no | 250 | 3 | 30 | 40 | 35 | 2.0 | 100 | 200 |

TABLE-continued

| | Resin in silver paste | Conductive adhesive | Pressing conditions: Temperature (° C.) | Pressing conditions: Pressure (N/multilayer body) | Pressing conditions: Time (s) | Characteristic value: Bonded area (%) | Initial characteristics: ESR (mΩ) | Initial characteristics: LC at 2 min (μA) | Characteristics after reflow[*]: ESR (%) | Characteristics after reflow[*]: LC at 2 min (%) |
|---|---|---|---|---|---|---|---|---|---|---|
| Comparative example 1 | Thermoplastic polyester | 0.20 mg/adherend surface | 150 | 0.6 | 30 | 50 | 30 | 2.5 | 133 | 2000 |
| Comparative example 2 | Thermoplastic polyester | 0.05 mg/adherend surface | 150 | 0.6 | 30 | 20 | 60 | 3.0 | 220 | 1800 |

(*)The characteristics after reflow are expressed as a percentage (%) with respect to the initial characteristics. When characteristics after reflow remain unchanged from the initial characteristics, they are denoted as 100%.

A change in the leakage current of each of the solid electrolytic capacitors of the examples was significantly smaller than those of the solid electrolytic capacitors of the comparative examples. The results indicated that the solid electrolytic capacitors of the examples were such that the degradation of electrical characteristics due to the application of a thermal or physical force to the capacitor elements was inhibited.

Regarding ESR, it was found that in the case where the bonding area was about 30% or more of the area of the surface of the cathode layer, ESR was small both before and after reflow.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A solid electrolytic capacitor comprising:
- a structure including adjacent laminated capacitor elements, each of the laminated capacitor elements including:
  - a valve metal base having a porous layer on a surface thereof;
  - a dielectric layer on the porous layer;
  - a solid electrolyte layer on the dielectric layer; and
  - a cathode layer on the solid electrolyte layer,
- wherein the respective cathode layers of the adjacent laminated capacitor elements are directly bonded together on at least a portion of a surface of each of the respective cathode layers by a thermoscompression bond such that no conductive adhesive is present in the portion of the surface of each of the respective cathode layers that are directly bonded together.

2. The solid electrolytic capacitor according to claim 1, wherein the respective cathode layers are directly bonded together at a central portion of the surface of each of the respective cathode layers.

3. The solid electrolytic capacitor according to claim 1, wherein the respective cathode layers are directly bonded together in 30% or more of an area of the surface of each of the respective cathode layers.

4. The solid electrolytic capacitor according to claim 1, wherein each of the respective cathode layers are directly bonded together with no conductive adhesive.

5. The solid electrolytic capacitor according to claim 1, wherein the cathode layer contains a resin.

6. The solid electrolytic capacitor according to claim 5, wherein the resin is a thermoplastic resin.

7. The solid electrolytic capacitor according to claim 1, wherein a difference between a maximum thickness portion and a minimum thickness portion of the capacitor element where the cathode layer is located is within 50 μm per capacitor element, before and after bonding of the respective cathode layers together.

8. A solid electrolytic capacitor comprising:
- a structure including adjacent laminated capacitor elements, each of the laminated capacitor elements including:
  - a valve metal base having a porous layer on a surface of the valve metal base;
  - a dielectric layer on the porous layer;
  - a solid electrolyte layer on the dielectric layer; and
  - a cathode layer on the solid electrolyte layer,
- wherein the respective cathode layers of the adjacent laminated capacitor elements are directly bonded together on at least a portion of a surface of each of the respective cathode layers by a thermoscompression bond such that no conductive adhesive is present in the portion of the surface of each of the respective cathode layers that are directly bonded together; and
- a cathode extended electrode in contact with and directly bonded to the cathode layer of at least one of the capacitor elements of the plurality of laminated capacitor elements.

9. The solid electrolytic capacitor according to claim 8, wherein the respective cathode layers are directly bonded together at a central portion of the surface of each of the respective cathode layers.

10. The solid electrolytic capacitor according to claim 8, wherein the respective cathode layers are directly bonded together in 30% or more of an area of the surface of each of the respective cathode layers.

11. The solid electrolytic capacitor according to claim 8, wherein each of the respective cathode layers are directly bonded together with no conductive adhesive.

12. The solid electrolytic capacitor according to claim 8, wherein the cathode layer of the at least one of the capacitor elements and the cathode extended electrode are directly bonded together at a central portion of the surface of the cathode layer of the at least one of the capacitor elements.

13. The solid electrolytic capacitor according to claim 8, wherein the cathode layer of the at least one of the capacitor elements and the cathode extended electrode are directly bonded together in 30% or more of an area of the surface of the cathode layer of the at least one of the capacitor elements.

14. The solid electrolytic capacitor according to claim 8, wherein the cathode layer of the at least one of the capacitor elements and the cathode extended electrode are directly bonded together with no conductive adhesive.

15. The solid electrolytic capacitor according to claim 8, wherein the cathode layer contains a resin.

16. The solid electrolytic capacitor according to claim 15, wherein the resin is a thermoplastic resin.

17. The solid electrolytic capacitor according to claim 8, wherein a difference between a maximum thickness portion and a minimum thickness portion of the capacitor element where the cathode layer is located is within 50 μm per capacitor element, before and after bonding of the respective cathode layers together.

* * * * *